United States Patent
Lakaniemi et al.

(10) Patent No.: US 7,532,612 B2
(45) Date of Patent: May 12, 2009

(54) TRANSMISSION TIMING

(75) Inventors: Ari Lakaniemi, Helsinki (FI); Antti Vähätalo, Tampere (FI)

(73) Assignee: Nokia Corporation, Espoo (FI)

( * ) Notice: Subject to any disclaimer, the term of this patent is extended or adjusted under 35 U.S.C. 154(b) by 1409 days.

(21) Appl. No.: 10/310,977

(22) Filed: Dec. 6, 2002

(65) Prior Publication Data

US 2003/0123428 A1 Jul. 3, 2003

(30) Foreign Application Priority Data

Dec. 7, 2001 (GB) ................................. 0129386.9

(51) Int. Cl.
*H04J 3/06* (2006.01)
(52) U.S. Cl. .................... 370/350; 370/352; 370/389; 370/335; 370/338; 370/505; 370/433; 370/435; 455/450; 455/464; 455/445
(58) Field of Classification Search ................ 370/350, 370/352, 337, 338, 335, 389; 704/228; 455/450, 455/422.1, 464
See application file for complete search history.

(56) References Cited

U.S. PATENT DOCUMENTS

| | | | | |
|---|---|---|---|---|
| 6,167,040 A * | 12/2000 | Haeggstrom | ................ | 370/352 |
| 6,181,712 B1 * | 1/2001 | Rosengren | ................... | 370/474 |
| 6,295,302 B1 * | 9/2001 | Hellwig et al. | .............. | 370/522 |
| 6,308,063 B1 * | 10/2001 | Koistinen et al. | ........ | 455/422.1 |
| 6,452,950 B1 * | 9/2002 | Ohlsson et al. | ............ | 370/516 |
| 6,512,918 B1 * | 1/2003 | Malomsoky et al. | ........ | 455/403 |
| 6,542,501 B1 * | 4/2003 | Tikka | ......................... | 370/389 |
| 6,697,364 B1 * | 2/2004 | Kekki et al. | ................... | 370/389 |
| 6,738,374 B1 * | 5/2004 | Olkkonen et al. | ........... | 370/389 |
| 6,879,599 B1 * | 4/2005 | Galyas et al. | ............... | 370/466 |
| 6,879,600 B1 * | 4/2005 | Jones et al. | .................. | 370/466 |
| 6,996,079 B1 * | 2/2006 | Bergenwall et al. | ......... | 370/331 |
| 7,050,439 B1 * | 5/2006 | Kaaresoja | ................ | 370/395.1 |
| 7,058,042 B2 * | 6/2006 | Bontempi et al. | ........... | 370/338 |
| 7,072,358 B2 * | 7/2006 | Suvanen | ..................... | 370/465 |
| 7,096,031 B1 * | 8/2006 | Friman | ........................ | 455/502 |

(Continued)

FOREIGN PATENT DOCUMENTS

| WO | WO 99/35876 | | 7/1999 |
|---|---|---|---|
| WO | WO 01/15473 | A1 | 3/2001 |
| WO | WO 01/45354 | A1 | 6/2001 |
| WO | WO 01/58097 | A1 | 8/2001 |

OTHER PUBLICATIONS

XP002171819: "Digital Cellular Telecommunications System (Phase 2+) . . . "; pp. 1-31; c. Jan. 2001.

(Continued)

*Primary Examiner*—Marceau Milord
(74) *Attorney, Agent, or Firm*—Squire, Sanders & Dempsey, L.L.P.

(57) ABSTRACT

A method for transferring data over a communication link from a first unit to a second unit, the link comprising a first portion across which the data is carried by the transmission of data packets at regular intervals, and a second portion between the first portion and the first unit over which the data is carried in a form that is not synchronised with the transmission of data packets over the first portion; the method comprising transmitting to the first unit synchronisation information regarding the times at which packets are to be transmitted over the first portion.

32 Claims, 2 Drawing Sheets

U.S. PATENT DOCUMENTS

| | | | | |
|---|---|---|---|---|
| 7,110,416 | B2 * | 9/2006 | Selin | 370/433 |
| 7,124,349 | B2 * | 10/2006 | Barrett et al. | 714/776 |
| 7,227,849 | B1 * | 6/2007 | Rasanen | 370/329 |
| 7,319,703 | B2 * | 1/2008 | Lakaniemi et al. | 370/505 |
| 7,333,805 | B2 * | 2/2008 | Oestreich | 455/423 |
| 7,372,847 | B2 * | 5/2008 | Koistinen | 370/352 |
| 7,408,948 | B2 * | 8/2008 | Lopponen et al. | 370/433 |
| 2001/0030978 | A1 | 10/2001 | Holloway et al. | |

OTHER PUBLICATIONS

Schulzrinne, H. et al., "RTP: A Transport Protocol for Real-Time Applications", Jan. 1996, pp. 1-71, http://www.ieft.org/rfc/rfc1889.txt.

Postel, J., "User Datagram Protocol", Aug. 28, 1980, pp. 1-3, http://www.ieft.org/rfc/rfc768.txt.

"Telecommunications and Internet Protocol Harmonization Over Networks (TIPHON); Using GSM Speech Codecs within ITU-T Recomindation H.323", v1.1.1, Aug. 1998, pp. 1-17.

GSM 08.60 "Digital Cellular Telecommunications System (Phase 2+); In-band Control of Remote Transcoders and Rate AdaptorS for Full Rate Traffic Channels", v8.1.0, Dec. 1999 at chapter 4.6.1 "Time Alighnment of the Speech Service Frames", pp. 1-40.

Mills, David L., "Network Time Protocol (Version 3): Specification Implementation and Analysis", Mar. 1992, pp. 1-113.

* cited by examiner

TRANSMISSION TIMING

FIELD OF THE INVENTION

This invention relates to controlling transmission timing, and especially remote controlling of transmission timing in packet switched media communication systems.

BACKGROUND OF THE INVENTION

Practically all modern telephony applications use speech compression to increase the efficiency with which the transmission media are used. The functional entity that performs the compression is called a speech codec. Most of the modern speech codecs operate by processing the speech signal in short segments called frames. For instance, all GSM (global system for mobile communications) codecs, including the AMR (adaptive multi-rate) codec, use 20 ms frames.

One commonly known property of a telephone link is that it is very sensitive to the delay introduced by the transmission of speech data transmission time from sender to receiver and back (so called round trip delay). Practical tests have shown that even relatively short round trip delay (around 400 ms) degrades the interactivity of the discussion, and round trip delays over 800 ms are found to reduce the quality of Service (QoS) to an unacceptable level. Therefore, generally a telephony system should be designed in such a way that the maximum round trip delay can be limited below a predetermined threshold so as to provide predictable and acceptable quality.

Traditional telephony services use the circuit switched (CS) approach. This means that the parties to the connection communicate over a transmission channel that is reserved for the whole duration of the communication. This implies that the data is transmitted over a fixed route, and also the transmission time is fixed and predictable. Therefore, this kind of telephone network can offer reliable service with controlled QoS. An important group of applications employing CS telephone services are some cellular mobile systems, e.g. GSM.

On the other hand, the emergence of the Internet has created a new platform for telephony applications: There are already a number of telephony applications which use packet switched (PS) networks (such as the Internet) to transmit speech data. Most, although not all, PS networks are based on IP (Internet protocol) protocols (like the Internet) and telephony applications running on this kind of networks are referred as IP telephony or Voice-over-IP (VoIP). The basic idea of a PS network is that the transmitted data is decomposed into small sub-blocks called packets, and the receiving application uses received packets to recompose the original data. Each packet can be transmitted from source to destination independently of other packets, and it is up to the network to route packets from source to destination. This implies that it is quite possible that the packets belonging to the same stream will use different routes to reach the destination. Furthermore, in general a PS network provides only a so-called 'best effort' service: the packets are transmitted from source to destination without any guarantees about the QoS. Therefore, it is possible that some of the packets are lost during transmission, and the time required for the transmission from source to destination is in the general case unpredictable. Due to varying load in the network and possibly also to different transmission paths of the packets, the transmission delay can vary from packet to packet within a stream. This variation in transmission time is called jitter. Considering the Internet in general, the transmission delay can vary from a negligible level to even several seconds. The same applies also to jitter, although usually the transmission time and jitter are related: in many cases long transmission time also means large jitter. This unpredictable delay behaviour is likely to cause quality problems for VoIP services. However, in a relatively small and closed IP network, such as a company LAN (Local Area Network), the delay and jitter can often be limited to a desired range by network design and by controlling the amount of traffic that is allowed into the network.

As an example, in the current GSM system the CS approach has been extended to cover data services over a CS radio channel. Because of the narrow bandwidth offered by the radio system (which was originally designed for speech services), the data rates offered are relatively low. In spite of this, these services have gained popularity, and rapid advances in radio technology are expected to significantly increase available data rates in the near future. On the other hand, the Internet offers a vast range of services, and therefore it would be appealing to combine these 'two worlds' to extend the coverage of the 'Internet services' also to mobile users. The convergence is also appealing from the telephony point of view, the scenario being that of a connection between a terminal in a cellular mobile (radio) network and a terminal in a VoIP domain.

One proposed system would include both CS and PS radio access networks (RANs), together with a PS core network (CN). Furthermore, the CN part of the network could be connected to an external PS network (such as the Internet or a company LAN) through a gateway (GW), thus enabling a connection to a terminal connected to this external network via its own access network (AN) This could conceivably enable seamless and transparent connection between terminals anywhere within reach of a concatenation of networks. FIG. 1 presents a greatly simplified illustration of this arrangement.

In a PS network, speech frames are typically transmitted using the Real-time Transport Protocol (RTP) packets. (See IETF RFC 1889 "RTP: A Transport Protocol for Real-Time Applications", 1996). Furthermore, RTP is typically run over User Datagram Protocol (UDP) and IP. (See IETF RFC 768 "User Datagram Protocol", 1980). GSM speech frames can be encapsulated into RTP packets according to the standard specified in ETSI TS 101 318 "Telecommunications and Internet Protocol Harmonization Over Networks (TIPHON); Using GSM speech codecs within ITU-T Recommendation H.323", v1.1.1, 1998. Currently, the IETF is also working on specifying a method to encapsulate AMR speech frames into RTP. This will be an important specification for 3G work, since the AMR codec has been selected to be the only mandatory speech codec for 3G systems.

The RTP Control Protocol (RTCP) is an integral part of the RTP specification Whenever RTP packets are used, RTCP packets should also be transmitted. (See IETF RFC 1889 "RTP: A Transport Protocol for Real-Time Applications", 1996). RTCP is used to monitor quality of service and to give information about the participants. RTCP packets are transmitted periodically, typically less often than RTP packets to save bandwidth (see section 6.2 of the IETF RFC 1889).

In the communication situation described above (and illustrated in FIG. 1), radio bandwidth is arguably the most scarce resource on a path from a fixed VoIP terminal to a mobile terminal in a cellular network. Furthermore, transmission over a RAN is likely to introduce a considerable amount of delay. Therefore, the radio link can be regarded as the 'bottleneck' within this connection, and it would be advantageous to try to optimise the use of radio band.

The efficient use of radio bandwidth requires strict scheduling of transmitted data, and this usually means that radio frames must be transmitted at fixed intervals. Furthermore, efficient radio transmission usually also implies that the data from different sources ('logical channels') is transmitted on the same radio block ('physical channel'). In pure CS environments this normally does not have any effect on the performance/delay of the system. On the other hand, the entity controlling the radio transmission timing does not have any control over transmission times of a terminal that is located in the PS VoIP domain. Transmission over the external PS domain is asynchronous, and in this kind of case the frames from different sources scheduled for radio transmission in the same radio block arrive at the RAN at different times and have to be buffered to wait for further transmission over the radio link.

FIG. 2 shows schematically the arrangement of a GSM mobile station, BTS (Base Transceiver Station) and BSC (Base Station Controller). The GSM mobile is connected to via radio interface to a ATS. Speech frames are transmitted between BTS and BSC in TRAU (Transcoder/Rate Adaptor Unit) frames. Speech frames are encoded/decoded in the TRAU unit, which is typically located in the BSC. Delay between GSM mobile and BSC may change during a call, since:
1. the time slot may change,
2. the GSM mobile may change from one BTS to another BTS inside the BSC area.

Normally, TRAU frames are transmitted every 20 ms. However, it is possible to change the length of the TRAU frames (and thus the transmission period) by changing the number of stop-bits located at the end of the TRAU frame.

To handle uplink timing, the BTS sends TRAU frames when those are received from the radio channel. The TRAU unit located in the BSC decodes the TRAU frames to speech samples, which are sent to the PCM line. Since the sampling interval is fixed in the PCM line, the TRAU unit can skip or repeat speech samples to adjust the timing in case the arrival of a TRAU frame differs from the nominal frame length 20 ms.

To handle downlink timing, the BTS sends TRAU frames to the radio channel at fixed intervals depending on timing in the radio channel. At the beginning of the call BSC has no information about timing at the BTS. Additionally, if the time slot or the BTS changes, the optimal timing changes too. To adjust the timing, BTS sends timing information to the BSC. According to this time alignment information, the BSC adjusts transmission time of the downlink TRAU frames. Again, transmission time can be adjusted by repeating or skipping PCM speech samples.

The above mentioned timing method is explained in detail in GSM 08.60 "Digital cellular telecommunications system (Phase 2+); In-band control of remote transcoders and rate adaptors for full rate traffic channels", v8.1.0, 1999 at chapter 4.6.1 "Time Alignment of the speech service frames".

SUMMARY OF THE INVENTION

According to the present invention there is provided a method for transferring data over a communication link from a first unit to a second unit, the link comprising a first portion across which the data is carried by the transmission of data packets at regular intervals, and a second portion between the first portion and the first unit over which the data is carried in a form that is not synchronised with the transmission of data packets over the first portion; the method comprising transmitting to the first unit synchronisation information regarding the times at which packets are to be transmitted over the first portion.

Preferred features of the invention are set out in the dependant claims.

BRIEF DESCRIPTION OF THE DRAWINGS

The present invention will now be described by way of example with reference to the accompanying drawings, in which.

DESCRIPTION OF THE PREFERRED EMBODIMENTS

Figure 1:
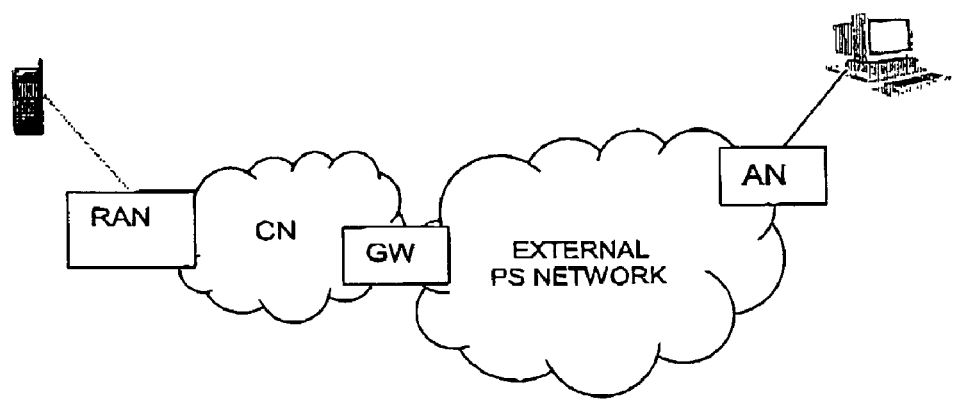
FIG. 1 shows a Connection between a mobile terminal and a fixed VoIP terminal.
Figure 2:
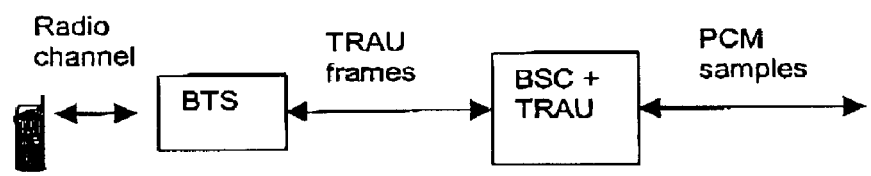
FIG. 2 illustrates speech transmission in a GSM system.

An embodiment of the invention will be described with reference to telephony applications. However, similar principles could be applied to any appropriate delay critical applications in which frame based media are used with fixed transmission intervals between successive data frames within a stream.

The PS network may introduce quite a long transmission delay and large jitter. In this case, proportional advance of a timing control will be quite small. However, an interactive packet based speech service is of limited attraction unless the delay can be limited to a small enough value. Thus, the VoIP domain should comprise a well regulated network with small jitter and relatively low transmission delay. In this case synchronization with the RAN can afford savings in overall delay. In many cases a LAN can provide small enough jitter and delay. Also a normal internet connection may fulfill these requirements, especially if QoS classifications are used.

Since the system might be operating near the maximum allowable delay, even small savings in the overall delay can make the system more feasible. Therefore, in this embodiment a method for controlling the transmission scheduling of a remote VoIP terminal (remote terminal is a terminal that is located in a different network than the other party of the connection) is provided.

In this embodiment the entity controlling transmission over a synchronized link (in this example a radio link) can send requests to the remote terminal with which it has established a link to adjust its transmission timing to match that of the radio link. The adjustment of transmission time can be performed at call set up and/or during the call:

1. The time adjustment can be performed during the call set-up (when the connection is being established) by indicating the correct 'grid' of the transmission times The initial control might require synchronization of the clocks in both ends. This can be performed e.g. by using Network Time Protocol (NTP). (See IETF RFC 1305 "Network Time Protocol (Version 3): Specification, Implementation and Analysis", 1992). The timing adjustment information can be sent using a proprietary protocol, or it could be possible to specify e.g. an RTCP message subtype for this purpose.

2. During a call there may be a need for re-adjustment due to, for example, handover in the radio network or to clock drift in the remote terminal. In case of on-line timing adjustment it is also desirable to have the capacity to manipulate the transmitted media by dropping data or generating some extra data, if the transmission time 'grid' is changed forward or backwards. In the case of a speech application the change could be performed safely with the aid of the speech encoder the adjustment could be performed during a speech pause or during a period of speech in which it is determined that the manipulation of the signal is unlikely to have a great impact on speech quality.

By synchronisation of the data transmission with the transmission slots available in the network overall transmission delay can be reduced. In theory the amount of saving in delay is up to the block duration of the transmitted media. For example with the AMR codec using 20 ms frames this method can save up to 20 ms in one-way transmission time. If the transmission is configured to encapsulate several consecutive frames into each transmitted packet, in some scenarios the possible saving could be even bigger.

One way to provide for the synchronisation information to be carried is by extending the RTCP protocol, for example by adding two optional fields to the RTCP packet. These fields contain an identifier and data as follows:

| | |
|---|---|
| Identifier | TIME_ALIGNMENT REQUEST (a constant) |
| Data | 16 bit signed integer indicating the amount of time shift to be done. The unit indication the change is the same as the unit of the timestamp in the RTP packet |
| Identifier | TIME_ALIGNMENT RESPONSE (a constant) |
| Data | 16 bit signed integer, which indicates the how much the timing has been changed. Typically, this is the same as in the request. However, in same cases the timing change may be implemented in small steps and further response messages will be transmitted later. The value may also be different if the time alignment can not be implemented with the asked resolution (in this case the closest value is chosen). Value "0" indicates that this entity is not capable of changing the timing. |

In use, the receiving unit sends a TIME_ALIGNMENT_REQUEST message to ask the transmitting unit to change the timing. When the transmitting unit has changed its timing, it indicates the change by sending TIME_ALIGNMENT_RESPONSE.

Figure 3:
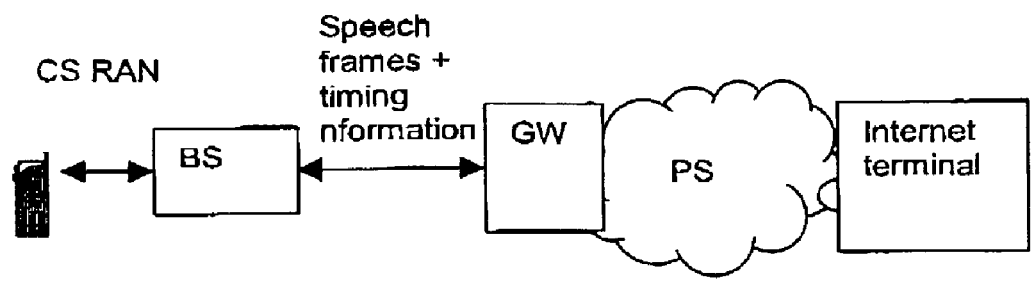
FIG. 3 illustrates a call via CS RAN to an internet terminal.

One example application of the system will be described with reference to FIG. 3.

Coded speech is transmitted over a CS RAN and through a GW to an internet terminal. As explained earlier, the packet transmission time of the CS RAN is fixed; in other words speech frames can be sent and received at fixed moments of time. The timing may also change during a call. The internet terminal, which contains also processing means for implementing the speech codec, can freely change its timing.

At the beginning of the call, the internet terminal starts to send the packets at an arbitrary moment. The GW has to buffer the incoming packets to fit them with CS RAN timing (the GW and BS (Base Station) exchange timing information). To minimize the delay, GW and the internet terminal can use the time alignment according to the following steps. For instance, if the AMR (Adaptive Multi-Rate) codec using 20 ms frames is employed, and the internet terminal transmits data with one frame per packet, and we assume that there is no jitter, the packets (frames) arrive at the GW at 20 ms intervals:

$$t_r(n) = t_0 + n*20,$$

where $t_r(n)$ indicates the reception time at GW for packet n, and $t_0$ indicates the time when the first packet of the stream was received. Now if the synchronized radio link (in BS) requires that the packets are transmitted to the radio path at $$t_t(m) = t_0 + m*20 + 18,$$

every packet would have to wait 18 ms in a buffer in the GW for the next 'transmission slot' on the radio link.

However, if we use the method proposed in this invention to send a message to the internet terminal and ask it to adjust its transmission in such a way that packets (frames) are sent 18 ms later, the reception from the internet terminal and transmission over the radio link would be 'synchronised', resulting in an 18 ms reduction in end-to-end transmission delay.

The transmission from the internet terminal can be started at an arbitrary moment of time, and the adjustment of transmission timing can be made immediately when the radio link timing is known. Re-adjustment can be needed e.g. because of the handover in the radio network, or because of the clock drift in the internet terminal.

The GW will typically request a time alignment that is shorter than the frame length. Sometimes it may happen that GW wants to change the timing more than the frame length, for instance in the situation where the GW has many frames in its input buffer. It this case, one option is for the GW simply to remove one or more frames from its buffer. However, this may cause audible deterioration. Instead, a time alignment request can be sent to the speech codec of the internet terminal. In the speech codec, the encoder can remove speech frames that are not important for good speech quality (e.g. frames containing speech pauses).

In the future, 3G systems or PS internet systems may provide services for conference calls. For voice, this service may contain a unit, which decodes each speech channel, sums the speech signals, encodes the summed signal and sends it back to a participant of the conference call. If the participants send speech packets that are not synchronous, the negotiation unit must delay the packets to be able to sum them. By synchronising the packets to the transmission slots the previously mentioned delay can be reduced.

The systems described above can be applied to a wide range of networks in which data is transmitted in periodic transmission slots, for example GSM, GERAN, UTRAN, or other types of network.

Thus by exchanging time alignment information in a call in a PS (packet switched) network, delay can be reduced. This is of particular value for real-time applications such as the transmission of speech, audio and/or video.

The method presented in this invention report can be applied to any delay critical packet based media (speech/audio/video) that employs constant transmission interval between successive packets within a stream. Examples of application areas are Voice over IP (VoIP) and teleconferencing applications over packet switched networks, but naturally this idea can applied to any delay critical packet based application.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A method, comprising:
    transferring data over a communication link from a first unit to a second unit,
    wherein the link comprises a first portion across which the data is carried by the transmission of data packets at regular intervals, and a second portion between the first portion and the first unit over which the data is carried in a form that is not synchronized with the transmission of data packets over the first portion; and receiving at the first unit synchronization information regarding the times at which packets are to be transmitted over the first portion.

2. The method as claimed in claim 1, further comprising determining, by the first unit, when to transmit data towards the second unit based on the synchronization information.

3. The method as claimed in claim 2, further comprising transmitting the data towards the second unit as data packets.

4. The method as claimed in claim 3, further comprising transmitting the packets towards the second unit at times determined based on the synchronization information to achieve a lower average delay in the packets entering the first portion of the link than half the period between transmission of packets over the first portion.

5. The method as claimed in claim 1, wherein the synchronization information is received in the form of an real-time transport control protocol message.

6. The method as claimed in claim 1, wherein the synchronization information is received by network time protocol.

7. The method as claimed in claim 1, wherein the data is delay-critical data.

8. The method as claimed in claim 7, wherein the data represents speech information.

9. The method as claimed in claim 8, wherein the data is carried is voice-over-internet-protocol data.

10. An apparatus, comprising:
a transmitter configured to transfer data over a communication link to a unit,
wherein the link comprises a first portion across which the data is carried by the transmission of data packets at regular intervals, and a second portion between the first portion and the apparatus over which the data is carried in a form that is not synchronized with the transmission of data packets over the first portion; and
a receiver configured to receive synchronization information regarding the times at which packets are to be transmitted over the first portion.

11. The apparatus as claimed in claim 10, wherein the transmitter is further configured to determine when to transmit data towards the unit based on the synchronization information.

12. The apparatus as claimed in claim 11, wherein the transmitter is further configured to transmit data towards the unit as data packets.

13. The apparatus as claimed in claim 12, wherein the transmitter is further configured to transmit the packets towards the unit at times determined based on the synchronization information to achieve a lower average delay in the packets entering the first portion of the link than half the period between transmission of packets over the first portion.

14. The apparatus as claimed in claim 10, wherein the synchronization information is received in the form of an real-time transport control protocol message.

15. The apparatus as claimed in claim 10, wherein the synchronization information is received by network time protocol.

16. The apparatus as claimed in claim 10, wherein the data is delay-critical data.

17. The apparatus as claimed in claim 16, wherein the data represents speech information.

18. The apparatus as claimed in claim 17, wherein the data is carried is voice-over-internet-protocol data.

19. An apparatus, comprising:
transferring means for transferring data over a communication link to a unit,
wherein the link comprises a first portion across which the data is carried by the transmission of data packets at regular intervals, and a second portion between the first portion and the apparatus over which the data is carried in a form that is not synchronized with the transmission of data packets over the first portion; and
receiving means for receiving synchronization information regarding the times at which packets are to be transmitted over the first portion.

20. A method, comprising:
receiving data, at a second unit, over a communication link from a first unit;
wherein the link comprises a first portion across which the data is carried by the transmission of data packets at regular intervals, and a second portion between the first portion and the first unit over which the data is carried in a form that is not synchronized with the transmission of data packets over the first portion; and
transmitting to the first unit synchronization information regarding the times at which packets are to be transmitted over the first portion.

21. The method as claimed in claim 20, wherein the synchronization information is sent in the form of an real-time transport control protocol message.

22. The method as claimed in claim 20, wherein the synchronization information is sent by network time protocol.

23. The method as claimed in claim 20, wherein the data is delay-critical data.

24. The method as claimed in claim 23, wherein the data represents speech information.

25. The method as claimed in claim 24, wherein the data is carried is voice-over-internet-protocol data.

26. An apparatus, comprising:
a receiver configured to receive data over a communication link from a unit,
wherein the link comprises a first portion across which the data is carried by the transmission of data packets at regular intervals, and a second portion between the first portion and the unit over which the data is carried in a form that is not synchronized with the transmission of data packets over the first portion; and
a transmitter configured to transmit to the unit synchronization information regarding the times at which packets are to be transmitted over the first portion.

27. The apparatus as claimed in claim 26, wherein the synchronization information is sent in the form of an real-time transport control protocol message.

28. The apparatus as claimed in claim 26, wherein the synchronization information is sent by network time protocol.

29. The apparatus as claimed in claim 26, wherein the data is delay-critical data.

30. The apparatus as claimed in claim 29, wherein the data represents speech information.

31. The apparatus as claimed in claim 30, wherein the data is carried is voice-over-internet-protocol data.

32. An apparatus, comprising:
receiving means for receiving data over a communication link from a unit,
wherein the link comprises a first portion across which the data is carried by the transmission of data packets at regular intervals, and a second portion between the first portion and the unit over which the data is carried in a form that is not synchronized with the transmission of data packets over the first portion; and
transmitting means for transmitting to the unit synchronization information regarding the times at which packets are to be transmitted over the first portion.

* * * * *